(12) United States Patent
Huber et al.

(10) Patent No.: US 9,650,139 B2
(45) Date of Patent: May 16, 2017

(54) FREIGHT LOADING SYSTEM AND METHOD FOR DETERMINING MOVEMENT OF A FREIGHT ITEM ON A CARGO DECK

(75) Inventors: Thomas Huber, Schliersee (DE); Richard Holzner, Stephanskirchen (DE)

(73) Assignee: Telair International GmbH (DE)

( * ) Notice: Subject to any disclaimer, the term of this patent is extended or adjusted under 35 U.S.C. 154(b) by 1159 days.

(21) Appl. No.: 13/280,926

(22) Filed: Oct. 25, 2011

(65) Prior Publication Data

US 2012/0101636 A1 Apr. 26, 2012

(30) Foreign Application Priority Data

Oct. 25, 2010 (DE) .......................... 10 2010 060 145
Feb. 15, 2011 (DE) .......................... 10 2011 000 743

(51) Int. Cl.
*B64D 9/00* (2006.01)

(52) U.S. Cl.
CPC .......... *B64D 9/00* (2013.01); *B64D 2009/006* (2013.01); *Y02T 50/46* (2013.01)

(58) Field of Classification Search
CPC ....... B60P 1/52; B64D 9/00; B64D 2009/006; B64D 1/02; B65G 13/065; B65G 2201/0267; Y02T 50/46; B64C 1/22
See application file for complete search history.

(56) References Cited

U.S. PATENT DOCUMENTS

| | | | | |
|---|---|---|---|---|
| 4,050,655 | A * | 9/1977 | Bogue et al. | 244/137.1 |
| 5,868,544 | A * | 2/1999 | Cox | 414/659 |
| 6,328,154 | B1 * | 12/2001 | Huber | 198/782 |
| 6,420,846 | B1 * | 7/2002 | Wolfe | 318/463 |
| 6,705,817 | B2 * | 3/2004 | Wittenstein et al. | 414/373 |
| 6,871,823 | B2 * | 3/2005 | Roberts | 244/137.1 |
| 7,199,543 | B1 * | 4/2007 | Hettwer | 318/480 |
| 7,402,973 | B2 * | 7/2008 | Hettwer | 318/563 |

(Continued)

FOREIGN PATENT DOCUMENTS

| | | |
|---|---|---|
| DE | 10158298 | 4/2003 |
| DE | 10338704 | 3/2005 |

(Continued)

OTHER PUBLICATIONS

European Search Report for EPO Application No. 11185941.9, dated Aug. 14, 2013.

*Primary Examiner* — Christopher E Everett
(74) *Attorney, Agent, or Firm* — Barnes & Thornburg LLP

(57) ABSTRACT

A freight loading system may include: freight transport devices each with at least one roller for transporting freight items in a transport direction and each sensor for detecting the presence of a freight item, wherein the rollers of at least a first freight transport device are mounted rotationally mobile such that the transport direction of the first freight transport device is adjustable, and a control unit which receives signals from sensors of at least two freight transport devices in order to detect a movement, of a freight item, wherein the control unit is designed to calculate from the signals a relative movement of part of the freight item relative to the first freight transport device and align the at least one roller of the first freight transport device taking into account the relative movement of the part of the freight item.

24 Claims, 4 Drawing Sheets

(56) References Cited

U.S. PATENT DOCUMENTS

| | | | |
|---|---|---|---|
| 7,604,204 B2* | 10/2009 | Jacobsen | B64D 9/00 244/118.1 |
| 2003/0179079 A1* | 9/2003 | Huber et al. | 340/286.01 |
| 2004/0037684 A1 | 2/2004 | Roberts | |
| 2006/0186271 A1* | 8/2006 | Jacobsen et al. | 244/137.1 |
| 2007/0057120 A1* | 3/2007 | McConnell | 244/118.1 |
| 2007/0138343 A1* | 6/2007 | Hettwer | 244/137.1 |
| 2007/0276619 A1* | 11/2007 | Sugahara et al. | 702/82 |
| 2009/0121084 A1* | 5/2009 | Hettwer | 244/137.1 |
| 2009/0121085 A1 | 5/2009 | Hettwer | |
| 2010/0100225 A1* | 4/2010 | Reed | B64D 9/00 700/213 |
| 2010/0209209 A1 | 8/2010 | Schulze | |
| 2010/0213313 A1* | 8/2010 | Reed | B64D 9/00 244/118.1 |

FOREIGN PATENT DOCUMENTS

| | | |
|---|---|---|
| DE | 102005008443 | 9/2006 |
| DE | 102005021078 | 11/2006 |
| DE | 102008052468 | 5/2009 |
| DE | 102009037982 | 5/2010 |
| DE | 102009020039 | 11/2010 |
| EP | 0937643 | 8/1999 |
| EP | 1378443 | 1/2004 |
| WO | 2004098995 | 11/2004 |
| WO | 2010127733 | 11/2010 |

* cited by examiner

FREIGHT LOADING SYSTEM AND METHOD FOR DETERMINING MOVEMENT OF A FREIGHT ITEM ON A CARGO DECK

CROSS-REFERENCE TO RELATED APPLICATIONS

This application claims priority to German Patent Applications No. 10 2010 060 145.4, filed Oct. 25, 2010 and 10 2011 000 743.1, filed Feb. 15, 2011, priority is claimed to these applications and the disclosures of these applications are incorporated by reference in their entirety.

BACKGROUND

The invention relates to a freight loading system for loading and unloading a cargo deck and a method for determining a movement of a freight item on a cargo deck of an aircraft.

For air freight transport, the freight items to be transported, in particular containers or pallets which are preferably made to specific standards, are attached inside the hold by means of lock elements on the cargo deck of the hold. Such lock elements frequently form freight loading tracks between which the standardised freight items can be positioned. To position the freight items at the locations provided for them, freight loading systems are used which support the ground staff in loading and unloading. These freight loading systems accelerate the loading and unloading process. Furthermore the freight loading systems must be very simple to operate as ground staff frequently have no training in a particular freight loading system. In addition both loading and unloading take place under high pressure of time, whereby incorrect operation can easily occur.

A faulty freight loading system, either because of incorrect operation or because of natural wear, can lead to substantial costs as it is very costly to shut down high capacity aircraft. Every minute which a high capacity aircraft spends on the ground costs the operator money.

Frequently freight items are loaded onto a cargo deck which has dimensions such that it is necessary to rotate the freight items, in particular in the area near the door. For this, the area near the door—called the loading and unloading area—is fitted with special function elements comprising freight transport devices (e.g. PDU's, power drive units) and roller mats. There are various strategies for rotating freight items in the physically very restricted loading and unloading area. Corresponding freight loading systems for rotating freight items are known from U.S. Pat. No. 4,050,655, DE 10 2005 008 443 B4, DE 10 2005 021 078 B4, DE 10 2008 052 468 A1 and DE 101 58 298 C1.

It has been shown that irrespective of strategy used to rotate the freight item on the cargo deck, the freight transport devices used are subject to very high wear. Furthermore the process takes a lot of time.

In a design consideration of the freight loading systems used here, it has been found that the loading and unloading area must be designed in a very complex manner. Here frequently freight transport devices of very large dimensions must be used which require separate sealing.

SUMMARY OF THE INVENTION

Some embodiments in accordance with the present invention specify an improved freight loading system for loading and unloading an aircraft cargo deck.

In particular this may be achieved by a freight loading system for loading and unloading a cargo deck, in particular an aircraft deck, wherein the freight loading system may include: a multiplicity of freight transport devices each at least with one roller for transporting freight items in a transport direction and each with at least one sensor for detecting the presence of a freight item, wherein the rollers of at least one first freight transport device are mounted rotationally mobile such that the transport direction of the first freight transport device can be set, and a control unit which receives signals from sensors from at least two freight transport devices in order to detect a movement, in particular a movement direction, of a freight item, wherein the control unit is designed such that a relative movement of a part of the freight item relative to the first freight transport device can be calculated from the signals and the at least one roller of the first freight transport device can be aligned taking into account the relative movement of the part of the freight item, in particular to reduce and/or minimise the friction of the roller.

Some embodiments may detect the movement of the item of freight transported on the cargo deck and use the information obtained to transport the freight item in a controlled and efficient manner. In conventional freight loading systems, the aim is to move the freight item by suitable control of the freight transport devices along prespecified movement tracks. Deviations for example because of the starting position always remain disregarded in the control of the freight transport devices, so that heavy wear occurs from time to time.

The present invention detects the actual movement of the freight item and uses the information to load the freight item optimally in the aircraft hold.

The information can be used firstly to adjust the rollers passively in order to reduce wear on the rollers. Secondly the information can be used to implement an active control strategy, wherein an actual relative movement of the freight item is compared with a nominal transport direction so that an optimum transport direction can be determined at least from these parameters.

The at least one roller of the first freight transport device, which preferably can swivel out of a rest position into a drive position to transport the freight item, can lie by force fit against a section of the freight item to drive the freight item. Methods for loading and unloading freight items are known from the prior art, in which the freight transport devices can swivel between a lowered rest position and a raised drive position, where in the drive position the roller lies in force fit against the freight item. To modify the transport direction of the freight item, frequently the freight item is stopped, the rollers of the freight transport device lowered, their alignment corrected and then the drive position resumed so that the freight item can be transported in another direction. This procedure is very complex. The present invention proposes making a continuous direction change wherein the roller of the first freight transport device at least part of the time during alignment lies with force fit against the freight item. Preferably the roller is aligned while constantly maintaining the force fit connection.

Preferably the drive rollers are arranged as close as possible to a rotation axis of the freight transport device so that on re-alignment thereof—possibly with force fit—as little friction as possible occurs.

Preferably the rollers of the freight transport devices are arranged such that their axes stand perpendicular to the rotation axis of the freight transport device concerned.

Preferably the rollers are re-aligned while being driven, in particular in real time.

The control unit can comprise a memory device which stores data in relation to the positions of the sensors relative to each other and/or the cargo deck (absolute positions), wherein the control unit is designed to calculate the relative movement of the part of the freight item using and/or taking into account the data from the memory device. In the end it is useful if the control unit knows the relative positions of the individual sensors and/or freight transport devices comprising the sensors, so that the signals from the sensors can be allocated to a particular location or position. Thus the control unit is able to establish which sections of the cargo deck are covered by a particular item of freight so that at least a rough position of the freight item can be derived.

The control unit can be designed to detect a dimension of a base surface of the freight item and process this to determine the position of the freight item. It is possible to detect the movement of the freight item by the provision of complex sensor means. Preferably however such complex sensor means are omitted, wherein the control unit uses additional information for example in the form of the dimension of the base surface of the freight item to achieve as accurate a result as possible.

For example the sensors can comprise light sensors which are arranged and formed on the cargo deck such that they detect at least the presence of the freight item passing over the sensor. Such sensors are adequately known in the specialist area and are very robust so that they will resist for a long time the aggressive conditions which occur in a hold. The light sensors can be arranged and formed such that they can detect the area immediately above the light sensor and determine whether part of the freight item is present in this area. To this extent the sensor can establish when a freight item is passing over it. Other sensor means for example mechanical sensor means are conceivable.

At least some of the sensors can be arranged in a matrix pattern spanning the cargo deck width, preferably in the loading and unloading area of the cargo deck. Preferably the sensors, in particular the light sensors, are distributed widely over the part area, preferably the loading and unloading area of the cargo deck, so that at different points on the cargo deck it can be established whether a part section of the freight item is present. To this extent the sensors can be used to determine the position of the freight item at a particular time.

At least some of the freight transport devices can comprise at least one sensor, preferably at least four sensors to detect the freight items.

At least some of the freight transport devices can each comprise a sensor which is arranged static relative to the cargo deck, in particular on a frame of the freight transport devices. The freight transport devices can comprise moving parts which for example move on re-alignment of the roller. The determination of the position of the freight item can be simplified if the sensors are arranged in a fixed pre-specified position, in particular static, in relation to each other. To this extent the individual positions of the sensors can be entered in the control unit once and then remain constant thereafter. It is not necessary to calculate the positions of the sensors as a function of the alignment of the freight transport devices.

The signals received from the sensors can also give a coverage pattern, wherein this coverage pattern allows the control unit to establish which of the sensors are covered by a freight item. For light sensors it would for example be possible to specify a degree of dimming. Preferably the coverage pattern is a binary coverage pattern which allows direct conclusions on the coverage (0 means that the corresponding sensor is covered by the freight item, 1 means that the corresponding sensor is not covered by a freight item).

To this extent the sensors can be allocated to the individual freight transport devices. Preferably these sensors can be used to establish whether a part of the freight item is located above the at least one roller of the freight transport device, so that a transport force can be applied by means of the roller. To this extent the sensors have a double function. Firstly they serve to determine locally whether a particular freight transport device can be used to transport the freight item. Secondly the sensor is part of a group of sensors which together allow determination of the position and/or movement of the freight item.

Preferably in the above embodiment example the freight transport devices are arranged in a matrix, in particular regular. This matrix can span the cargo deck preferably over the entire width in the loading and unloading area. Also a regular arrangement can be applied in the longitudinal direction. Preferably the matrix formed by the freight transport devices is a substantially even matrix.

Preferably the sensors in particular to perform the former function are arranged on the respective freight transport device surrounding the at least one roller.

At least some of the freight transport devices can as already specified be arranged in a matrix, preferably in the loading and unloading area of the cargo deck. Preferably here a multiplicity of freight transport devices is arranged which guarantee effective transport of the freight item. Because of the precise control of the individual freight transport devices it is no longer necessary, as described in the prior art, to provide individual very powerful freight transport devices. Rather several small freight transport devices can assume the function of the large freight transport devices. Preferably the smaller freight transport devices have a smaller construction height, for example less than 10 cm, in particular less than 5 cm (2 inches). Such freight transport devices can be provided in the hold without it being necessary to provide additional drainage troughs below each freight transport device. Because of the low height of the freight transport devices, which can be installed without major modifications to the cargo deck, weight and costs are saved. The seal of the hold floor remains unaffected and possible interference with structures or systems below the floor is avoided.

The matrix of freight transport devices according to the invention preferably comprises at least 6, preferably at least 12 freight transport devices.

The at least one freight transport device can comprise at least one rotary table which is arranged in a frame rotatable about a vertical axis and which accommodates at least one roller in order to adjust the roller to transport the freight item in a specified transport direction. The at least one roller of the freight transport device is mounted rotationally mobile such that this can rotate within a plane running substantially parallel to the cargo deck. To this extent it is possible to set any angle so that freight items can be transported in any arbitrary direction.

Preferably the sensors of the respective freight transport device are arranged on the frame so that they stand still when the rollers are swivelled. The position of the sensors therefore does not change, so that from these the control unit can effectively determine the position of the freight item.

Further sensors can be provided on the freight transport device, in particular on the frame. For example these can be a temperature sensor, in particular an infrared sensor. This temperature sensor can monitor the temperature of the drive motor and/or the brake and/or the plates. Also this temperature sensor can be arranged and designed such that it can detect a temperature of passing freight items in order to detect in good time a possible fire in the cargo. The temperature sensors can be in communicative connection with the control unit so that the information obtained can be passed on. For example it would be conceivable to provide a corresponding warning system in the cockpit or in a floor station. The warning can be given by an acoustic and/or visual signal (e.g. a horn and/or warning light).

The freight loading system can comprise a read device, in particular an RFID reader, to detect the freight item type and/or at least one dimension, preferably a dimension of a base surface of the freight item. To this extent it is possible when introducing the freight item to detect information on the freight item so that this information can be taken into account in determining the position of the freight item on the cargo deck.

The read device can be used to detect additional or alternative information on pallet size, weight, destination and/or a 2D or 3D contour. These data can be stored in an RFID chip preferably integrated in the freight item or attached to the load. Preferably the read device is located in a door or entrance area of the aircraft deck in order preferably to detect the data of a freight item entering the aircraft.

Preferably the control unit comprises a model generator to produce an at least two-dimensional, preferably three-dimensional model of the freight item and/or at least part of the hold of the aircraft. Using the model produced it is possible to determine precisely the position of the freight item on the cargo deck. The model of the hold can be used to move the freight item automatically within the hold without a colliding with elements of the hold or the aircraft fuselage.

The control unit can comprise a position memory device to store position data in a temporal sequence which specifies the position of the freight item on the cargo deck, wherein the control unit is designed to determine the movement of the freight item from a determined actual position and stored position data from the position memory device. As already explained initially, preferably sensors are used which are suitable only for position determination. By storing individual positions in a temporal sequence, the movement of the freight item can be determined. Preferably for this a corresponding model is generated so that future positions can be predicted. The control unit is able to process all information to determine the movement of the freight item. For example control signals for the freight transport devices can be taken into account.

The control unit can be designed to determine a nominal position and an actual position of the freight item and control at least one freight transport device such that the freight item is transported from the actual position to the nominal position. The control unit thus preferably implements an automatic process of transporting the freight item.

The control unit can be designed to determine, instead of the actual position and nominal position, a nominal transport direction for at least one freight transport device. The freight transport device can be designated a control freight transport device.

The control unit can be designed to determine, preferably in real time, the relative movement of the freight item close to or at the position at which the at least one roller of the first freight transport device makes contact, and a nominal transport direction. Preferably the roller is aligned taking into account the relative movement of the freight item and the nominal transport direction. To this extent the control unit can make an assessment taking into account firstly the planned transport direction and secondly the friction of the roller.

The control unit can be designed to determine, from the actual position and nominal position, a nominal transport direction for at least one freight transport device, in particular the control transport device.

In this context the control unit can also be designed to determine, taking into account the relative movement, an optimum transport direction for at least one freight transport device, in particular the control freight transport device, wherein when assuming the optimum transport direction, the axis of the roller of the respective freight transport device stands substantially perpendicular to the relative movement of the freight item lying on the roller.

Furthermore the control unit can be designed to calculate a set transport direction from the optimum transport direction and the nominal transport direction, in particular as a weighted mean, and structure the at least one freight transport device, in particular the control freight transport device, according to the optimum transport direction. For the actual setting of the freight transport devices in a particular direction, for example the optimum transport direction, it is necessary to take into account various parameters. Amongst others the actual movement of the freight or freight item can be taken into account. Furthermore the proposed transport direction, for example the direction in which a freight item must be transported so that it is moved from an actual position into a nominal position, is taken into account. Further parameters such as inertia, torque etc. can influence the calculation.

In some embodiments a method for determining a movement of a freight item on a cargo deck may be provided. The method may include the following steps: determining of the dimensions and/or shape of a base surface of a freight item by a control unit; receiving a multiplicity of first signals from sensors which are arranged distributed over at least part of the cargo deck and give the coverage by the freight item, at a first time; calculating by the control unit of a first position of the freight item from the first signals taking into account the dimension and/or shape of the base surfaces of the freight item; storing of the first position of the freight item in a memory; receiving of a multiplicity of second signals from the sensors at a second time; calculating by the control unit of a second position of the freight item from the second signals taking into account the dimensions and/or shape of the base surface; and calculating of the movement of the freight item by comparison of the first position of the freight item with the second position.

The at least one freight transport device can be aligned by the control unit taking into account the movement of the freight item, in particular the relative movement of the freight item, directly above the freight transport device. Preferably the method according to the invention comprises a corresponding alignment of the freight transport device taking into account the calculated information.

Preferably a memory device of the control device contains position data of the individual freight transport devices and the respective sensor devices. These data allow the control device to allocate a particular position on the cargo deck to each signal relating to a sensor device. The signals thus give a position-related coverage pattern.

Also in the method according to the invention sensors are used to detect the movement of the freight item. Preferably these sensors merely indicate whether part of the freight item is above them. The control unit can process the corresponding output signals to determine a position of the freight item on the cargo deck. By recording these positions over time, conclusions can be drawn in relation to the movement track of the freight item.

A freight loading system for loading and unloading the cargo deck may be provided. The system may include: a multiplicity of freight transport devices each with at least one roller to transport freight items in a transport direction, wherein the rollers of at least one first freight transport device are mounted rotationally mobile such that the transport direction of the first freight transport device can be adjusted; and a control unit which receives signals from sensors to detect a movement of a freight item, wherein the control unit is designed to calculate from the signals a relative movement of a section of the freight item relative to the first freight transport device and align the at least one roller of the first freight transport device such that the friction of the roller is minimised.

DETAILED DESCRIPTION

Figure 1:
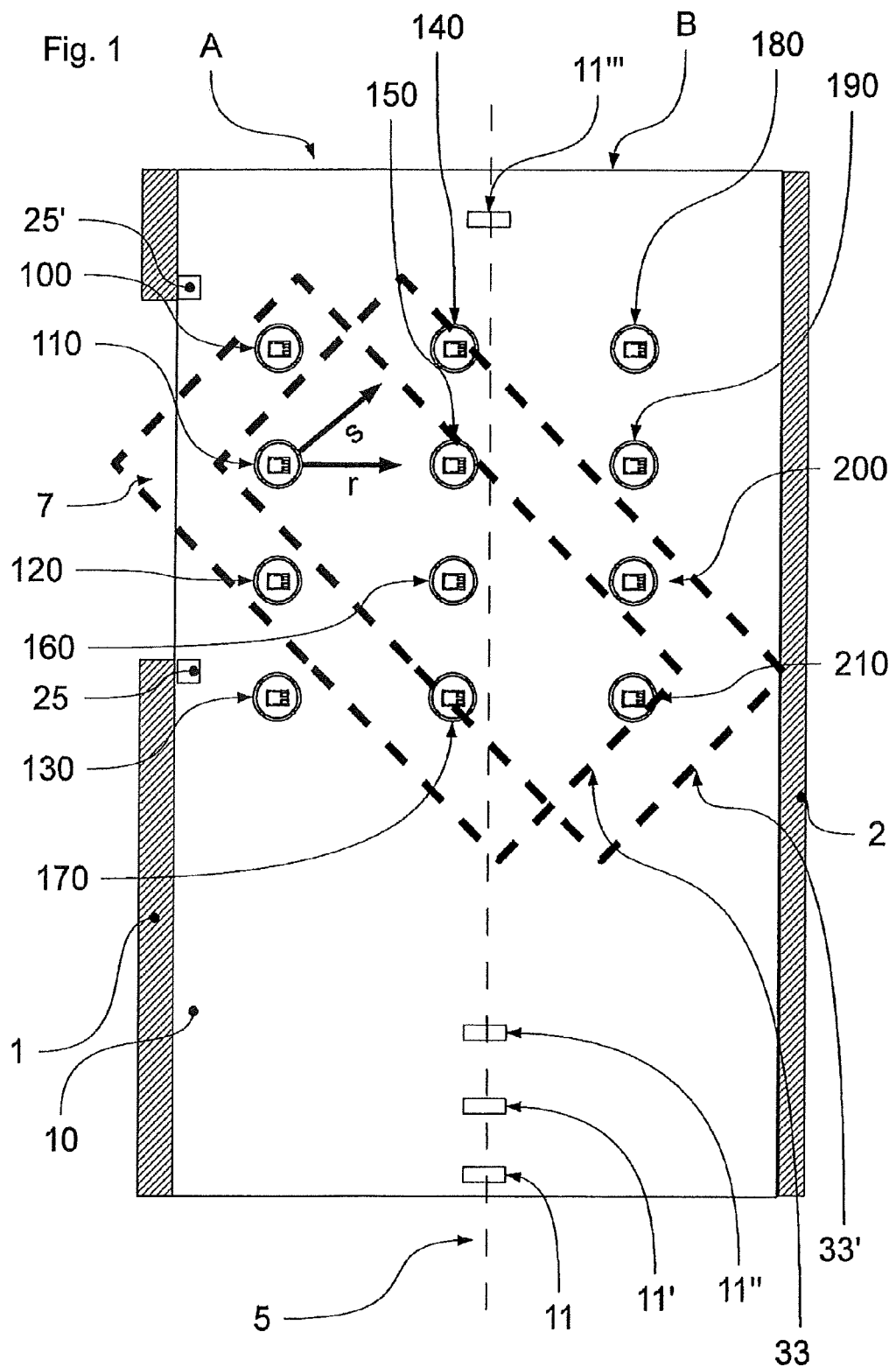
FIG. 1 a top view of part of a cargo deck with numerous freight transport devices.

An embodiment of the invention is described below by means of an embodiment example which is explained in more detail with reference to the figures.

In the description below the same reference numerals are used for the same parts and those with similar effect.

FIG. 1 shows a top view of cargo deck 10 with a freight loading system according to the invention. The part of the cargo deck 10 shown is substantially rectangular and extends in the x-y plane (the y direction corresponds to the longitudinal direction of the aircraft and the x direction to the transverse direction) of the aircraft and is limited by a left side wall 1 and a right side wall 2. The left side wall 1 is interrupted in parts to form a door opening 7. Through this door opening 7 a freight container 30 shown in FIG. 7 can be introduced into the hold. The freight loading system according to the invention is particularly suitable for transporting bulky containers which must be rotated for stowage within the hold. The freight loading system can however be used in conjunction with clearly smaller freight containers 30 of any dimensions. The freight container 30 shown in FIG. 7 has a length l which is clearly longer than the width of the cargo deck 10 shown in FIG. 1 so that the freight container 30 on loading must be rotated in the loading and unloading area using the additional space offered by the door opening 7.

The cargo deck 10 of the aircraft shown in FIG. 1 is configured so that a first freight loading track A and a second freight loading track B are available to receive individual freight containers 30. For this along a centre plane 5 of the cargo deck 10 are arranged centre locks 11, 11', 11", 11"'. The freight loading tracks A, B have a width which substantially corresponds to width b of the freight container 30. Usually further function elements are provided to hold the freight container 30 suitably in the freight loading tracks A, B. The loading and unloading area of the cargo deck 10 in FIG. 1 is equipped with twelve freight transport devices 100, 110, 120, . . . , 210. These freight transport devices 100, 110, 120, . . . , 210 are distributed over the loading and unloading area. Preferably the freight transport devices 100, 110, 120, . . . , 210 are distributed over the loading and unloading area so that a freight container 30 to be loaded with a freight base contour 33, 33', irrespective of its position, always covers at least two, preferably at least three, freight transport devices 100, 110, 120, . . . , 210. In the configuration shown in FIG. 1 the freight transport devices 100, 110, 120, . . . , 210 are arranged in a matrix comprising a multiplicity of lines (in the x direction) and columns (in the y direction). Each line in the configuration shown in FIG. 1 comprises three freight transport devices 100, 110, 120, . . . , 210 and each column comprises four freight transport devices 100, 110, 120, . . . , 210.

For the skilled person active in this field it should be evident that an arbitrary other distribution of freight transport devices 100, 110, 120, . . . , 210 can be selected to achieve an extensive coverage of the loading and unloading area. Thus four, five, six, eight or substantially more freight transport devices can be installed in each column or line. Furthermore it is possible to arrange the freight transport devices 100, 110, 120, . . . , 210 in symmetrical and asymmetrical configurations to fulfil the particular requirements of the hold concerned. The regular configuration selected in FIG. 1 has the advantage that the individual positions of the freight transport devices 100, 110, 120, . . . , 210 on the cargo deck 10 can easily be detected. Nonetheless it would theoretically also be possible to use an arbitrary network of freight transport devices 100, 110, 120, . . . , 210 to equip the loading and unloading area and detect the corresponding positions.

Figure 7:
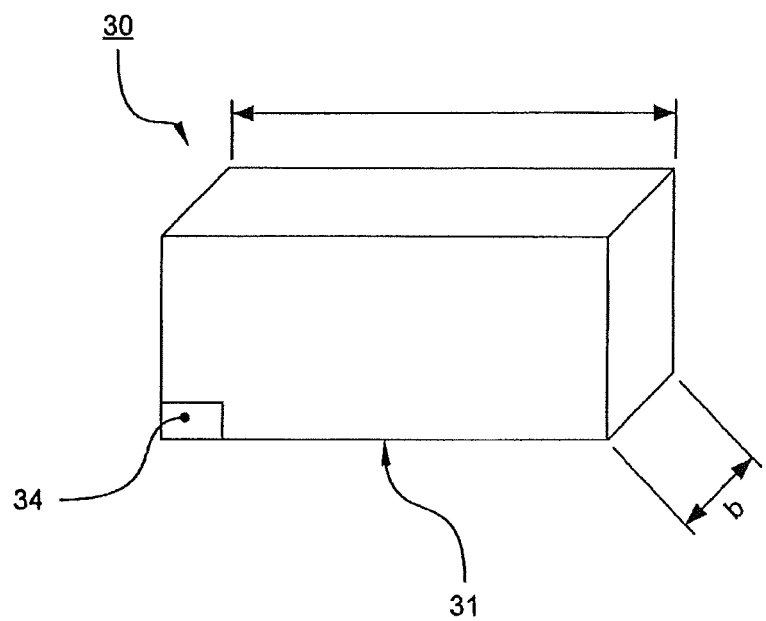
FIG. 7 a diagrammatic view of a freight item.

Either side of the door opening 7 are arranged RFID readers 25, 25' which can detect an RFID tag 34 on the freight container 30 (see FIG. 7). To this extent, a control device 20 connected with the RFID reader 25, 25' is able to identify unambiguously an incoming freight container 30. An identification number obtained can be used to determine the freight container width b and length l, i.e. the dimensions, of the freight container 30. Alternatively the RFID tag 34 can contain concrete information on these dimensions. In a further embodiment example a laser scanner can be arranged at the door opening 7 or at any other suitable position to determine the dimensions of the incoming freight container 30.

The freight transport devices 100, 110, 120, . . . , 210 are designed to transport the incoming freight container 30 and move it to a prespecified position within the freight loading tracks A, B. In FIG. 1 the freight base contours 33, 33' are indicated diagrammatically. It is evident that the already slightly oblique freight container 30 has been shifted along the x axis in relation to the first freight base contour 33 by means of the freight transport devices 100, 110, 120, . . . , 210 in order to assume the position shown by the second freight base contour 33'. The freight transport devices 100, 110, 120, . . . , 210 used can for example be the type described in DE 198 07 229 A1. Preferably however freight transport devices 100, 110, 120, . . . , 210 are used which have a very low construction height so that their installation can be operated at very low cost. Because of the control of the freight loading system according to the invention it is possible to operate the shown number of freight transport devices 100, 110, 120, . . . , 210 parallel to each other such that the individual transport devices 100, 110, 120, . . . , 210 need apply substantially less force. To this extent the desired construction measures can be implemented without further action.

Figure 2:
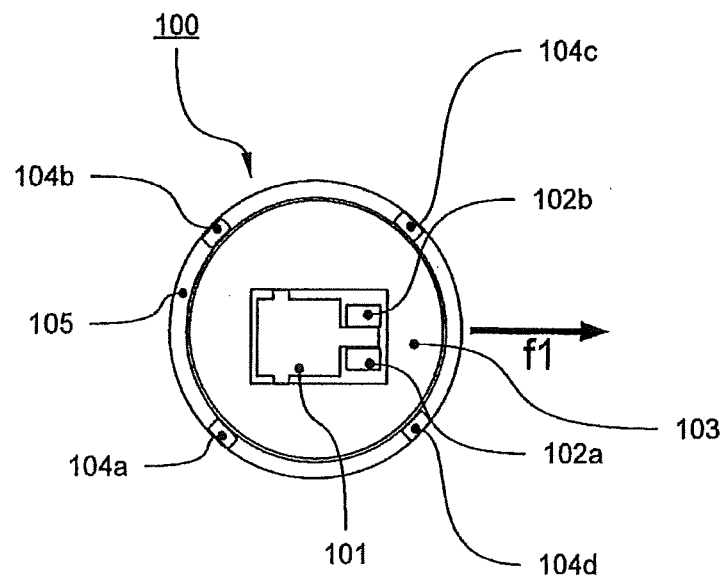
FIG. 2 a top view of a freight transport device in a first position (set angle 0°)
Figure 3:
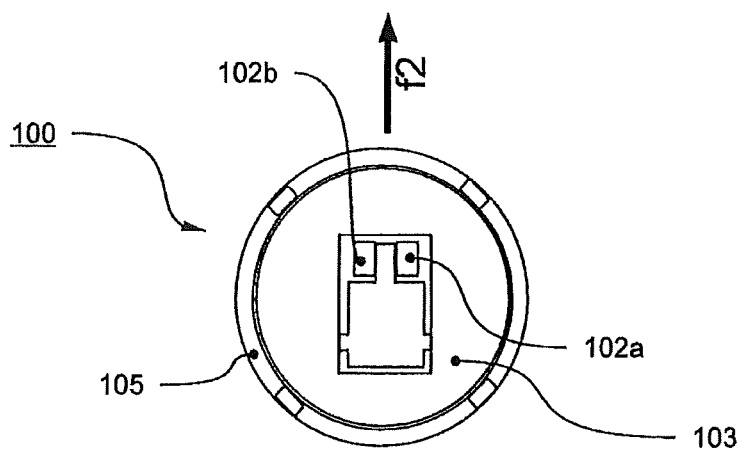
FIG. 3 the freight transport device in FIG. 2 in a second position (set angle 270°)

Freight transport devices 100, 110, 120, . . . , 210 used for preference are explained in more detail below with reference to FIGS. 2 to 5. FIGS. 2 to 5 show example detail views of the freight transport device 100. The freight transport device 100 has an annular frame 105 and a circular rotation plate 103 arranged inside the frame 105. The rotation plate 103 is mounted rotationally mobile within the frame 105 so that it can rotate in the x-y plane about a rotation axis 106. The freight transport device 100 has corresponding actuators and sensors so that the rotation plate 103 can be aligned arbitrarily within the frame 105. The sensors allow a conclusion on the alignment of the rotation plate 103 within the frame 105. FIGS. 2 and 3 show two different alignments of the rotation plate 103.

The rotation plate 103 accommodates a roller drive unit 101 which drives rollers 102a, 102b. Drive rollers 102a, 102b are designed to drive freight items 30 in a direction transverse to the rotary axis of the drive rollers 102a, 102b, substantially within the x-y plane. FIG. 2 shows the freight transport device 100 which is aligned such that it can transport the freight in a first transport direction f1. For the skilled person active in the field it will be evident that the freight items 30 can be driven in the opposite direction by driving the drive rollers 102a, 102b in the opposite direction of rotation. The alignment shown in FIG. 2 is designated the base position and corresponds below to a zero degree alignment. In contrast rotation plate 103 of freight transport device 100 is twisted through 90° in FIG. 3 (set angle 270°) so that freight containers 30 can now be transported in the second transport direction f2.

The preferred freight transport device 100 comprises furthermore four sensor devices 104a, 104b, 104c, 104d arranged on the frame 105. Thus the alignment of the rotation plate 103 does not influence the position of sensor devices 104a, 104b, 104c, 104d. Preferably the sensor devices 104a, 104b, 104c, 104d are each arranged on opposite sides of frame 105. Thus the first sensor device 104a is in the 45° region of the freight transport device 100, the second transport device 104b in the 135° region, the third sensor device 104c in the 225° region and the fourth sensor device 104d in the 315° region. Sensor devices 104a, 104b, 104c, 104d are light sensors comprising light-emitting diodes and photodiodes so that the sensor devices 104a, 104b, 104c, 104d are suitable for detecting the presence of a freight item directly above sensor devices 104a, 104b, 104c, 104d.

Figure 4:
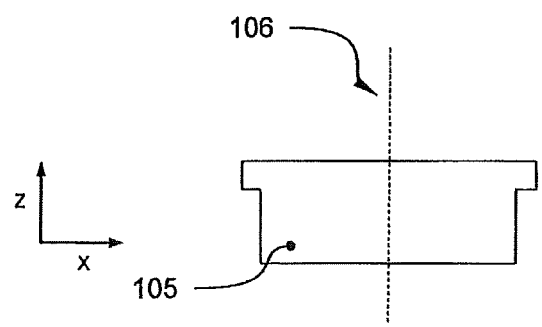
FIG. 4 the freight transport device in FIG. 2 in side view, wherein the drive rollers are in a rest position.
Figure 5:
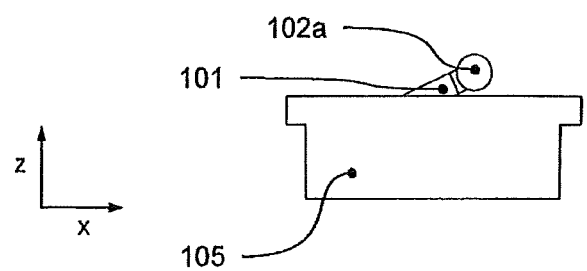
FIG. 5 a side view of the freight transport device in FIG. 2, wherein the drive rollers are in a drive position.

As shown in FIGS. 4 and 5, the freight transport device 100 is designed to swivel the drive rollers 102a, 102b from a rest position into a drive position (FIG. 5). In the rest position the drive rollers 102a, 102b are lowered within the rotation plate 103 so that they no longer protrude above the frame 105. In the drive position the drive rollers 102a, 102b protrude beyond the frame 105 and can drive freight items. Swivelling between the rest position and the drive position is sensible to avoid damage to the freight transport device 100 from a side collision of a freight item with the drive rollers 102a, 102b. It is also possible to modify the alignment of drive rollers 102a, 102b without material friction by lowering them in a situation in which a freight item or container 30 is standing directly above the freight transport device 100. The sensors devices 104a, 104b, 104c, 104d can be used to establish whether it is sensible to extend the drive rollers 102a, 102b from the rest position into the drive position.

With the four sensor devices 104a, 104b, 104c, 104d it is possible to detect whether a pallet is approaching the PDU in the transverse direction. Thus it can be ensured that the PDU is lowered when driven over by the load unit and only raised when the PDU is completely covered (preventing side collisions).

Because of the arrangement of the individual freight transport devices 100, 110, 120, . . . , 210 already described with reference to FIG. 1, and the fact that each freight transport device 100, 110, 120, . . . , 210 is equipped with corresponding sensor devices 104a, 104b, 104c, 104d, a network of sensor devices 104a, 104b, 104c, 104d is produced which covers the loading and unloading area of the cargo deck 10 relatively densely.

The freight loading system according to the invention comprises the control device 20 which is in communicative connection with the individual freight transport devices 100, 110, 120, 210 and associated sensor devices 104a, 104b, 104c, 104d to achieve an effective control of the freight transport devices 100, 110, 120, 210.

Figure 6:
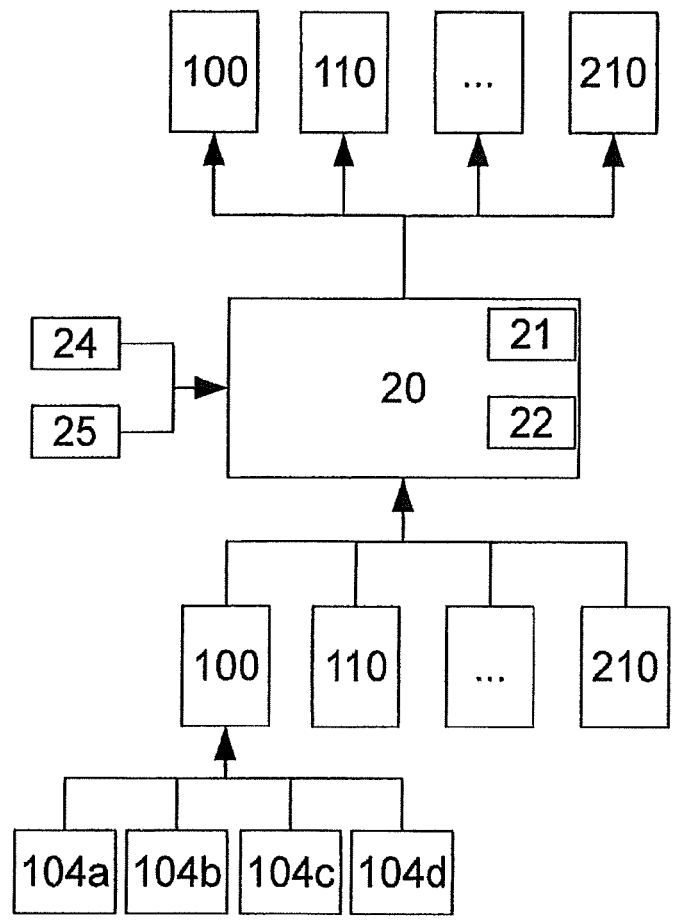
FIG. 6 a diagrammatic view of the freight loading system comprising numerous sensors and actuators.

The present invention uses the fact that because of the multiplicity of sensor devices 104a, 104b, 104c, 104d present, the position of the freight container 30 can be determined effectively. As shown in FIG. 6, the control device 20 receives individual signals from the respective sensor devices 104a, 104b, 104c, 104d via the freight transport devices 100, 110, 120, 210. Furthermore it receives signals from the RFID reader 25 giving the dimensions of the base 31 of freight container 30. The control device 20 knows the positions of the individual sensor devices 104a, 104b, 104c, 104d and can thus allocate the signals to particular positions on the cargo deck 10. For the control device 20 a coverage pattern results which indicates at which point one of the sensor devices 104a, 104b, 104c, 104d of the freight transport devices 100, 110, 120, . . . , 210 is covered by the base 31 of the freight container 30. Using this information the position of the freight container 30 on the cargo deck 10 can be determined relatively precisely. If for example we consider the freight base contour 33 which indicates a first position of freight contour 30, it is clear that the first freight transport device 100, the second freight transport device 110, the third freight transport device 120, the sixth freight transport device 150, the seventh freight transport device 160, the eighth freight transport device 170 and the twelfth freight transport device 210 are completely covered by the freight container 30. To this extent the respective sensor devices 104a, 104b, 104c, 104d emit corresponding signals to the control device 20. As the control device 20 knows the dimensions of the freight container 30, the position of the freight container 30 can be determined relatively precisely within particular tolerances. The memory device 21 can store either the absolute positions of the sensor devices 104a, 104b, 104c, 104d of the respective freight transport devices 100, 110, 120, . . . , 210. Alternatively relative position data can be present which for example allow determination of the relative position of the freight transport device 100 to freight transport device 110 or 120. In a further alternative embodiment the relative positions can relate to the sensor devices 104a, 104b, 104c, 104d. For example a relative datum with regard to sensor device 104a of freight transport device 100 to sensor device 104a of freight transport device 110 can be stored. The skilled person active in the field will be aware of numerous further possibilities for storing corresponding position data on a memory device 21 so that the control device 20 is able to determine, from the coverage pattern, the position of the freight container 30 on the cargo deck 10.

For example using a model generator 22 a virtual image (two- or three-dimensional) can be produced which is moved in a virtual model of the sensor devices 104a, 104b, 104c, 104d (in particular the relative position of the individual sensor devices 104a, 104b, 104c, 104d to each other) until a virtual configuration results which would lead to a signal pattern corresponding to the actual signals received from the sensor devices 104a, 104b, 104c, 104d. Preferably the model generator 22 not only generates the virtual network of sensor devices 104a, 104b, 104c, 104d but also takes into account further physical features of the hold (e.g. side restrictions for example in the form of side walls 1, 2, the position of door opening 7, existing function elements e.g. in the form of lock elements etc.). Preferably the model generator 22 knows that when loading freight container 30, only containers of certain standard dimensions are used (e.g. 88×125 inch, 96×125 inch, 196×96 inch, 238.5×96 inch etc.). The control device 20 can take this information into account when determining the position. Model generator 22 can generate a complete three-dimensional model of at least the loading and unloading area of the hold.

If now the freight container is driven so that its position changes, as explained in relation to the second freight base contour 33', a new coverage pattern of the freight transport devices 100, 110, 120, . . . , 210 results. It appears that only the second freight transport device 110, the sixth freight transport device 150, the seventh freight transport device 160, the eleventh freight transport device 200 and the twelfth freight transport device 210 are completely covered by the freight container 30. The fifth freight transport device 140 and the eighth freight transport device 170 have merely partial coverage. All other freight transport devices 100, 120, 130, 180, 190 are not covered by freight container 30. This second position of freight container 30 can also be determined from the sensor devices 104a, 104b, 104c, 104d. According to the invention the control unit 20 stores corresponding position data in a memory device 21 and from the stored information determines the movement of the freight container 30 on the cargo deck 10. For the skilled person active in the field, it will be evident that the control device 20 can receive a multiplicity of signals to perform a substantially more detailed modelling of the movement of the freight container 30. The sensor devices 104a, 104b, 104c, 104d are scanned at a rate of at least 1 Hertz, preferably 10 Hertz or 100 Hertz, so that a very precise position determination and/or modelling of the movement processes can be performed. The control device 20 now uses this information to adjust the freight transport devices 100, 110, 120, . . . , 210 suitably. Thus the control device 20 can determine that the freight container is moving over the second freight transport device with a particular speed in a particular direction. In FIG. 1 this relative movement r is indicated with the corresponding vector arrow. The control device 20 can now align the second freight transport device 210 (e.g. to a zero degree angle) so that the rotary axes of drive rollers 102a, 102b stand substantially perpendicular to this determined relative movement r so that an effective drive of freight container 30 is possible with minimum wear. Furthermore freight transport devices 100, 110, 120, . . . , 210 which are not yet covered by freight container 30 can already be controlled so that they are already aligned suitably as soon as they are covered.

Furthermore the information obtained with regard to movement of the freight container 30 can be used to transport this semi- or fully automatically into a desired position, for example in the freight loading track B. Thus a user of the freight loading system according to the invention can enter, for example via an input device 20, a desired position for the freight container 30. The control device 20 thus knows an actual position and a target position and can develop a corresponding transport strategy to transport the freight container 30 from the actual position into the target position. Thus the control device 20 can come to the conclusion that the freight container 30 must be swivelled clockwise out of the second position according to the second freight base contour 33' in order to park it in the freight loading track B. The control device 20 can thus determine a nominal transport direction s for each freight transport device 100, 110, 120, . . . , 210 covered by freight container 30 and take this nominal transport direction into account when controlling the freight transport device 100, 110, 120, . . . , 210. In FIG. 1 the nominal transport direction s is symbolised by a corresponding vector arrow. It would also be possible to stop the freight container 30, align the second freight transport device and all further freight transport devices concerned suitably, and then transport freight container 30 further in a corresponding direction. Preferably however a quasi-continuous transport of the freight container 30 takes place so that there is no need to stop the freight container 30 for a direction change. The control device 20 thus at a given time determines the relative movement r for a particular freight transport device, for example for the second freight transport device 110, and a corresponding nominal transport direction s. From these values a setting of the freight transport devices 100, 110, 120, 210 is determined which initiates a suitable course correction. To this extent the freight container 30 is swivelled continuously in the freight loading track B, wherein only a very low wear occurs on the freight transport devices 100, 110, 120, 210.

In a preferred embodiment example the described configuration of the cargo deck 10 with sensor devices 104a, 104b, 104c, 104d of the respective freight transport devices 100, 110, 120, . . . , 210 is used to produce a virtual image of the base 30 of the freight container and compare this virtual image with stored two- or three-dimensional models of the hold in order then to control the freight transport devices 100, 110, 120, 210, in particular the respective rotation plates 103 (direction of rotation of drive rollers 102a, 102b, alignment of rotation plate 103) by calculation so that it is possible to rotate the freight container 30 in the hold semi- or fully automatically. Preferably a quasi-continuous control of the individual transport devices 100, 110, 120, . . . , 210 takes place, wherein their setting, in particular the alignment of the rotation plate 103 during movement of the freight container 30 is regulated to achieve as tangential a movement as possible of the freight base 31 via the drive rollers 102a, 102b. This avoids unnecessary wear.

It is possible to determine a two- or three-dimensional model of the freight container 30 to be loaded on the basis of manual inputs. Thus the freight loading system according to the invention can have stored for example in the memory device 21 two- or three-dimensional models of all common freight container types. It is possible for the user of the freight loading system according to the invention to select the corresponding freight container 30. Secondly the freight container type can be detected automatically. With the freight loading system according to the invention it is even possible to load freight containers 30 with overlap. For example corresponding data suitable for producing a two- or three-dimensional model of the freight container with overlap can be stored on the said RFID tag 34. The control device 20 can determine an optimum control plan from the model of the hold and the freight container 30 so that there is no collision of the freight container 30 with the aircraft, in particular its outer skin.

In application of a suitable control strategy, preferably corresponding fixed points are used so that the position and movement of the freight item can be determined with great precision. For example before entering the freight loading track B, the freight container 30 can be aligned completely to function elements arranged along the right side wall 2 opposite the door opening 7.

Although in the embodiment example described above the sensor devices 104a, 104b, 104c, 104d are arranged on freight transport devices 100, 110, 120, . . . , 210, it would also be possible to provide some or all of these separate from the freight transport devices 100, 110, 120, . . . , 210. To this extent a network or grid of sensor devices 104a, 104b, 104c, 104d completely independent of freight transport devices 100, 110, 120, . . . , 210 could be established.

Although the invention is explained in the description above with reference to a cargo deck of an aircraft, it can be used in conjunction with any arbitrary cargo deck e.g. also in a logistics centre.

LIST OF REFERENCE NUMERALS 1, 2 Side wall
5 Centre plane
7 Door opening
10 Cargo deck
11, 11', 11", 11'" Centre lock
20 Control device
21 Memory device
22 Model generator
24 Input device
25 RFID sensor device
30 Freight container
31 Freight base
33, 33' Freight base contours
34 RFID tag
100, 110, 120, . . . , 210 Freight transport devices
101 Roller drive unit
102a, 102b Drive rollers
103 Rotation plate
104a, 104b, 104c, 104d Sensor devices
105 Frame
106 Rotation axis
X, Y, Z x, y, z direction
A Freight loading track A
B Freight loading track B
r Relative movement
s Nominal transport direction
f1, f2 Transport directions
b Freight container width
l Freight container length

The invention claimed is:

1. A freight loading system for loading and unloading a cargo deck comprising:
   a multiplicity of freight transport devices each with at least one roller adapted to contact a freight item for transporting the freight item in a transport direction and each with at least one sensor for detecting the presence of the freight item,
   a control unit which receives signals from sensors of at least two freight transport devices in order to detect a movement direction of the freight item wherein the control unit is designed to calculate from the signals a movement direction of a part of the freight item relative to the first freight transport device and wherein the at least one roller of at least one first freight transport device is mounted rotationally mobile for rotation about a vertical axis such that the transport direction of the first freight transport device is adjustable; and rotate the at least one roller of the first freight transport device about the vertical axis to align the at least one roller with the movement direction of the part of the freight item, during movement of the freight item and while the freight item is in contact with the at least one roller of the first freight transport device, to at least one of: reduce and minimize abrasive wear of the at least one roller.

2. The freight loading system according to claim 1, wherein the control unit is designed to align the first freight transport device while the roller is in contact with part of the freight item in order to drive the freight item during alignment.

3. The freight loading system according to claim 1, wherein the control unit comprises a memory device which stores the data relating to the position of the sensors relative to each other and on the cargo deck wherein the control unit is designed to calculate the relative movement direction of the part of the freight item using the data from the memory device.

4. The freight loading system according to claim 1, wherein the control unit is designed to perform a method for determining a movement direction of a freight item on a cargo deck comprising:
   determining at least one of the dimensions and shape of a base surface of the freight item by a control unit;
   receiving a multiplicity of first signals from sensors which are arranged distributed over at least part of the cargo deck, wherein the first signals indicate coverage of the freight item at a first time;
   calculating by the control unit of a first position of the freight item from the first signals taking into account at least one of: the dimensions and shape of at least the base surface;
   storing the first position of the freight item in a memory;
   receiving a multiplicity of second signals from the sensors at a second time;
   calculating by the control unit of a second position of the freight item from the second signals taking into account at least one of: the dimensions and shape of the base surface; and
   calculating the movement direction of the freight item by comparison of the first position of the freight item with the second position.

5. The freight loading system according to claim 1, wherein the control unit is designed to detect a dimension of a base surface of the freight item and process this to determine at least one of: a position of the freight item and the relative movement of the part of the freight item.

6. The freight loading system according to claim 1, wherein the sensors comprise light sensors arranged on the cargo deck and designed such that they detect at least the presence of a freight item.

7. The freight loading system according to claim 1, wherein at least one of either the sensors and multiplicity of freight transport devices, are arranged in a matrix spanning the width of the cargo deck.

8. The freight loading system according to claim 1, wherein at least some of the freight transport devices each comprise at least one sensor which is arranged static relative to the cargo deck.

9. The freight loading system according to claim 1, wherein the sensors of a respective freight transport device are arranged surrounding the at least one roller.

10. The freight loading system according to claim 1, wherein the signals give a binary coverage pattern.

11. The freight loading system according to claim 1, wherein the first freight transport device comprises at least one rotary table arranged in a frame rotatable about the vertical axis and which accommodates at least one roller in order to set the roller to transport the freight item in a pre-specified transport direction.

12. The freight loading system according to claim 1, further comprising a read device, to detect at least one of either: the freight item type and at least one dimension of the freight item.

13. The freight loading system according to claim 1, wherein the control unit comprises a model generator to produce: at least one of a two-dimensional, and three-dimensional, model of the freight item, and at least part of the hold of the aircraft.

14. The freight loading system according to claim 1, wherein the control unit comprises a memory device configured to store position data in a temporal sequence indicating the position of the freight item on the cargo deck, wherein the control unit is designed to determine the movement of the freight item from the determined actual position and the stored position data from the position memory device.

15. The freight loading system according to claim 1, wherein the control unit is designed to determine a nominal position and an actual position of the freight item and control at least one freight transport device such that the freight item is transported out of the actual position into the nominal position.

16. The freight loading system according to claim 1, wherein the control unit is designed to determine from the actual position and nominal position a nominal transport direction (s) for at least one freight transport device.

17. The freight loading system according to claim 1, wherein the control unit is designed to determine, taking into account the relative movement, an optimum transport direction for at least one freight transport device wherein when assuming the optimum transport direction the axis of the roller of the respective freight transport device runs substantially perpendicular to the relative movement of the freight item lying on the roller.

18. The freight loading system according to claim 1, wherein the control unit is designed to calculate a set transport direction from the optimum transport direction and the nominal transport direction(s), and align the at least one freight transport device according to the optimum transport direction.

19. The freight loading system according to claim 1, wherein the control unit is configured: to determine, preferably in real time, the relative movement direction of the freight item close to or at the position at which the at least one roller of the at least one freight transport device makes contact and determine a nominal transport direction (s); and to align the roller taking into account the relative movement direction of the freight item and the nominal transport direction (s).

20. The freight loading system according to claim 1, wherein the control unit receives and processes the signals from the sensors of the at least two freight transport devices to determine a coverage pattern, the coverage pattern indicating which of the freight transport devices and/or sensors are covered by the freight item, the determination of the movement direction of the freight item being based on the coverage pattern.

21. A method for determining a movement direction of a freight item on a cargo deck comprising:
    determining at least one of: the dimensions and shape of a base surface of the freight item by a control unit;
    receiving a multiplicity of first signals from sensors which are arranged distributed over at least part of the cargo deck, wherein the first signals indicate a first coverage pattern by the freight item at a first time, the first coverage pattern indicating which of the sensors are covered by the freight item at the first time;
    calculating by the control unit of a first position of the freight item from the first signals taking into account at least one of the dimensions and shape of at least the base surface;
    storing the first position of the freight item in a memory;
    receiving a multiplicity of second signals from the sensors at a second time, the second signals indicating a second coverage pattern by the freight item at the second time, the second coverage pattern indicating which of the sensors are covered by the freight item at the second time;
    calculating by the control unit of a second position of the freight item from the second signals taking into account at least one of: the dimensions and shape of the base surface;
    calculating the movement direction of the freight item by comparison of the first position of the freight item with the second position of the freight item; and
    rotating at least one roller of a transport device about a vertical axis to align the at least one roller with the movement direction of the freight item during movement of the freight item and while the at least one roller of the transport device is in contact with the freight item.

22. The method according to claim 21, further comprising reading of a memory mounted on the freight item by means of a reader to determine at least one of: the dimension and shape of at least the base surface of the freight item.

23. The freight loading system according to claim 21, wherein the second signals indicate coverage by the freight item at the second time.

24. A freight loading system for loading and unloading a cargo deck comprising:
    a multiplicity of freight transport devices each with at least one roller for transporting freight items in a transport direction and each with at least one sensor for detecting the presence of a freight item, wherein the freight rollers of at least one first freight transport device are mounted rotationally mobile for rotation about a vertical axis such that the transport direction of the first freight transport device is adjustable; and
    a control unit which receives signals from sensors of a plurality of the freight transport devices in order to determine a first coverage pattern at a first point in time and a second coverage pattern at a second point in time, the first coverage pattern indicating which of the freight transport devices and/or sensors are covered by the freight item at the first point in time and the second coverage pattern indicating which of the freight transport devices and/or sensors are covered by the freight item at the second point in time,
    wherein the control unit is designed to calculate using the coverage patterns a relative movement direction of at least a part of the freight item relative to the first freight transport device and rotate the at least one roller of the first freight transport device about the vertical axis to align the at least one roller with the relative movement direction of the part of the freight item during movement of the freight item and while the freight item is in contact with the at least one roller of the first freight transport device to at least one of: reduce and minimise abrasive wear of the at least one roller.

\* \* \* \* \*